US011303447B2

(12) United States Patent
Leedom (10) Patent No.: US 11,303,447 B2
(45) Date of Patent: Apr. 12, 2022

(54) AUTHENTICATION SYSTEM USING PAIRED, ROLE REVERSING PERSONAL DEVICES

(71) Applicant: Syferex, LLC, West Palm Beach, FL (US)

(72) Inventor: Erik C. Leedom, Brooklyn, NY (US)

(73) Assignee: Syferex, LLC, West Palm Beach, FL (US)

( * ) Notice: Subject to any disclaimer, the term of this patent is extended or adjusted under 35 U.S.C. 154(b) by 516 days.

(21) Appl. No.: 16/409,552

(22) Filed: May 10, 2019

(65) Prior Publication Data
US 2019/0349196 A1 Nov. 14, 2019

Related U.S. Application Data

(60) Provisional application No. 62/670,363, filed on May 11, 2018.

(51) Int. Cl.
| | |
|---|---|
| *H04L 29/06* | (2006.01) |
| *H04L 9/32* | (2006.01) |
| *H04L 9/08* | (2006.01) |
| *G06F 9/451* | (2018.01) |
| *G06F 1/16* | (2006.01) |
| *G06Q 20/40* | (2012.01) |
| *H04W 12/041* | (2021.01) |

(52) U.S. Cl.
CPC ............. *H04L 9/321* (2013.01); *G06F 1/163* (2013.01); *G06F 9/451* (2018.02); *G06Q 20/401* (2013.01); *H04L 9/0861* (2013.01); *H04L 63/0478* (2013.01); *H04W 12/041* (2021.01); *H04L 2209/12* (2013.01); *H04L 2209/56* (2013.01)

(58) Field of Classification Search
CPC ......... H04L 9/321; G06F 9/451; G06F 1/163; H04W 12/041
USPC ......................................................... 713/155
See application file for complete search history.

(56) References Cited

U.S. PATENT DOCUMENTS

| | | | | |
|---|---|---|---|---|
| 7,707,420 | B1 * | 4/2010 | Little | H04L 9/3247 713/176 |
| 9,270,448 | B2 * | 2/2016 | Gonzalez | H04L 9/0819 |
| 9,942,051 | B1 * | 4/2018 | Poltorak | H04W 12/02 |
| 10,079,674 | B2 * | 9/2018 | Maniatakos | H04L 9/008 |
| 10,129,211 | B2 * | 11/2018 | Heath | G06Q 10/10 |
| 10,516,532 | B2 * | 12/2019 | Taub | H04L 63/0442 |
| 10,559,049 | B2 * | 2/2020 | Abt, Jr. | H04L 63/0823 |

(Continued)

*Primary Examiner* — Monjur Rahim
(74) *Attorney, Agent, or Firm* — Tollefson IP (57) ABSTRACT

An authentication system is provided for authenticating users in accordance with an encryption/decryption algorithm using first and second separately unique encryption keys that are time variable and are uniquely associated with each user, having a first user controlled computing device under the control of the user for generating said first encryption key using an encryption key generating algorithm. The first user controlled computing device includes a key transmitter for transmitting wirelessly within the immediate vicinity of the user the first encryption key, a second user controlled computing device, operating as a coordinating device under the control of the user, for generating the second encryption key using the encryption key generating algorithm. The second user controlled computing device includes a key receiver for receiving the first encryption key.

30 Claims, 9 Drawing Sheets

(56) References Cited

U.S. PATENT DOCUMENTS

| | | | |
|---|---|---|---|
| 10,592,692 B2 * | 3/2020 | Brannon | G06F 16/972 |
| 10,594,668 B1 * | 3/2020 | Sanchez | H04L 63/083 |
| 10,630,477 B1 * | 4/2020 | Ju | H04L 9/0894 |
| 10,708,305 B2 * | 7/2020 | Barday | H04L 63/1491 |
| 10,796,020 B2 * | 10/2020 | Barday | G06F 11/3438 |
| 10,819,512 B2 * | 10/2020 | Rittenhouse | H04L 9/14 |
| 10,909,488 B2 * | 2/2021 | Hecht | G06F 21/554 |
| 11,004,125 B2 * | 5/2021 | Barday | G06Q 50/265 |
| 11,057,356 B2 * | 7/2021 | Malhotra | G06F 16/288 |
| 11,184,165 B2 * | 11/2021 | Baligh | H04L 9/0891 |
| 2012/0066496 A1 * | 3/2012 | Blom | H04L 63/0807 |
| | | | 713/168 |
| 2014/0096215 A1 * | 4/2014 | Hessler | H04W 12/06 |
| | | | 726/7 |
| 2016/0100310 A1 * | 4/2016 | Lee | H04W 76/14 |
| | | | 713/171 |
| 2018/0054305 A1 * | 2/2018 | Djakovic | H04W 12/50 |
| 2019/0349754 A1 * | 11/2019 | Larignon | H04L 9/0872 |

* cited by examiner

AUTHENTICATION SYSTEM USING PAIRED, ROLE REVERSING PERSONAL DEVICES

CROSS REFERENCE TO RELATED APPLICATION

This application claims priority to U.S. Provisional Application No. 62/670,363, filed May 11, 2018, the content of which is hereby incorporated by reference in its entirety.

FIELD OF INVENTION

This invention relates to authentication of individuals using encrypted communications employing a Certification Authority.

BACKGROUND OF THE INVENTION

The migration of data to digital and, more recently, cloud based storage solutions presents a fundamental and existential security risk to individuals and organizations. The need to ensure that access is only granted to the appropriate entities is critical to ensure that the benefits of this migration are not outweighed by the dangers. This means the ability to authenticate an entity as who or what it claims to be are becoming increasingly important. Many methodologies have been proposed and implemented but most are flawed, either because they offer poor reliability or are too cumbersome and obtrusive for wide adoption.

One important attempt to provide digital security is known as a chain of trust which is established by validating each component of hardware and software from the end entity up to a root certificate. It is intended to ensure that only trusted software and hardware can be used while still retaining flexibility and ease of use. X.509 certificate chains is a widely used standard for digital certificates for use in chain of trust systems, https://tools.ietf.org/html/rfc4158. However, there are a number of notable publications which describe problems associated with X.509 certificate chains. See for example Ellison, Carl and Schneier, Bruce, "Top 10 PKI risks" (PDF), Computer Security Journal (Volume XVI, Number 1, 2000); Gutmann, Peter. "PKI: it's not dead, just resting" (PDF), IEEE Computer (Volume: 35, Issue: 8); and Gutmann, Peter. "Everything you Never Wanted to Know about PKI but were Forced to Find Out" (PDF). Retrieved 14 Nov. 2011. These problems relate to architectural weaknesses (including aggregation, delegation and federation problems) and other weaknesses that do not avoid Man-In-the-Middle attacks including problems with certification authorities and other implementation issues.

Other methodologies for providing data security rely on a user remembering a unique passcode, phrase or pin. Such passcodes must be complex and difficult enough to avoid discovery by guessing or brute force but also easy enough to remember that the user will be able to recall and input them when needed. Moreover, due to their nature, they can be observed and copied without the user being aware they have been compromised.

In an attempt to overcome the ease with which security can be breached, it has become more common to require two factor authentication. This approach achieves greater security but requires the user to input two pieces of data or interact with two different components of the system (for instance a password and a previously authenticated contact point (a phone number that is know to be the users phone number), thus increasing the complexity and intrusiveness to the user.

Attempts have been made to improve upon two factor authentication by increasing the complexity of the data by deriving it from some highly unique but repeatable source such as a fingerprint, voiceprint, facial features or other biometric or environmental seed. Here again the passkey is static and if the source can be copied, or the key that is generated by the source reproduced or copied, the system is compromised. This has been discussed extensively in the prior art. For example, Adrian Bridgwater has described biometrics as a third factor in authentication technology and noted " . . . [f]ingerprint images can be scanned and copied, voice can be recorded and facial image recognition techniques can potentially be circumvented via the use of simple pictures . . . . [These] third-factor[s] are . . . far from secure," *Biometrically Challenged: Three-factor Authentication Systems too Weak for Web Banking*, Haymarket Media, Inc., Mar. 22, 2016, https://www.scmagazine.com/biometrically-challenged-three-factor-authentication-systems-too-weak-for-web-banking/article/529016/?DCMP=EMC-SCUS_Newswire&%253BspMailingID=14047225&%253BspUserID=MjMyMDAwM
zMzMjk4S0&%253BspJobID=741814899&%253BspReportId=NzQxODE0ODk5S0, The introduction of randomized symmetric key generation technologies such as RSA's SecureID, *Authentication Your Way with RSA SecurID®Access*, https://information.rsa.com/rsa-securid-authentication-your-way.html?gclid=CjwKCAiAIL_UBRBoEiwAXKgW59fPz
jmiIFUILNZJDiVrMJTJ-h13ofEoqWUjV-
gn9uoxvJ6t6_BF4xoCBngQAvD_BwE, reduce the effectiveness of obtaining a key and increase the difficulty in guessing or deducing it by changing the key regularly. To ensure that the device generating the key has not fallen into compromised hands, the standard application of this technology still requires the user to input some sort of password which can be compromised. Additionally some implementations require a dedicated hardware device such as a token that is an encumbrance, adds cost and difficult for the end user to implement and use.

Hybrid solutions can solve one problem but they retain or even compound other issues For example, see Nymi™ authentication system, https://nymi.com/solutions#individual_workstations which allows authentication through proximity detection of an authenticating wearable. While this system provides a significant advance in ease of use, this approach suffers from a number of drawbacks including its reliance on biometric sensing (see above) that inherently involves a fixed seed and requires the expense and bother of creating, distributing and operating a dedicated proprietary wearable in the form of a wrist mounted device.

Retail transactions using credit cards require the retailer to facilitate the transaction between the customer and the credit card company. As a by-product of these transactions the retail party comes in contact with confidential information (credit card numbers and client names) for which it must then be responsible. Data breaches of retail transaction data can cause a huge financial liability to retailers. There are several examples of this outcome when such 3rd parties do not meet their custodial responsibility and customer's sensitive information is compromised by an unauthorized access, 11 *of the Largest Data Breaches of All Time*, https://www.opswat.com/blog/11-largest-data-breaches-all-time-updated.

Some of the deficiencies of the prior art are addressed by a technology disclosed in U.S. Pat. No. 8,341,397 (assigned to MLRLLC, LLC a Virginia limited liability company)

where specialized software is downloaded into wirelessly linked handheld and wearable devices such as a conventional smartphone and off-the-shelf smartwatch. The '397 technology minimized the amount of dedicated, proprietary hardware required for implementation and the secret encryption key is constantly changed so it cannot be copied and reused. Moreover, the user is not required to provide any remembered data. In the retail environment, a useful implementation of the '397 technology relies upon a line of sight barcode link between the handheld and the retailer's point of sale equipment.

While useful for the purposes disclosed, the '397 technology does not disclose an embodiment that is well adapted to on-site "retail" purchases without the requirement of an optical bar code link and associated equipment. This requirement constitutes an impediment to widespread adoption of the technology in the retail environment. Moreover, the '397 technology requires the use of a handheld device, such as a smartphone, but does not teach how to achieve a high level of security should a consumer choose a set of devices that does not include a handheld device. The '397 technology also fails to teach the advantages of having multiple personal devices, under the control of the user, wherein each device participates in the generation of multiple encryption keys for use in forming encrypted messages and can operate as a coordinating device as desired by the user.

Other advances in the field have suggested multiple separate computer devices under the control of the user such as U.S. Pat. No. 8,214,890 to Kirovski et al (Microsoft) which discloses a login authentication from a client computer to a remote server using a separate "trusted" device which is under the user's control to establish a communication channel between the trusted device and the client. A second communication channel is established between the trusted device and the client where the second channel is not part of the network. The second secure connection is "tunneled" within the first secure connection to allow the user to "login" to the server over the second connection using the trusted device. Moreover, Kirovski et al '890 protects the user in case the user's trusted device is lost or stolen because the finder (or thief) will not have the required user login credentials. Should a user's credentials become known to a malicious party, the user's trusted device will not typically be available to the malicious party. While this system avoids the requirement for a specialized token device and reduces the vulnerabilities associated with certain types of malware, the Kirovski et al '890 disclosed invention fails to eliminate the need for input of user names and passwords. Moreover, Kirovski et al '890 fails to envision the client and trusted devices reversing roles or how the trusted device could be rendered ineffective if it comes into the possession of a malicious party who also has obtained the user's login credentials.

Canadian published application (CN104125068A) and world patent application (WO2016028752A1) both disclose wearable devices that allow for wireless data storage and retrieval from the wearable device upon appropriate authentication but do not disclose authentication using a remote certification authority or other important features of this invention.

SUMMARY OF THE INVENTION

This Summary is provided to introduce a selection of concepts (including various objectives, advantages and benefits) in a simplified form, which are further described hereafter in the Detailed Description. This Summary is not intended to identify key features or essential features of the claimed subject matter, nor is it intended to be used as an aid in determining the scope of the claimed subject matter.

Selective Principles:

The invention described herein is designed to achieve the high security benefits of the '397 technology in cooperation with a Certification Authority (CA) which among other functions operates as an authenticating authority AA without requiring the user to employ a handheld device such as a smartphone. Instead, a minimum of two user controlled computing personal devices (PDs) defined as a computer resource (virtual or physical) under the control of the user that is capable of running a key generating algorithm and (ideally encrypted) wireless communication with the other RD, and at least one of these devices must be capable of assuming the role of a Coordinating Device CD defined as a device that has the capabilities of a PD and further includes a user interface UI which allows the user to interact with the CD and to communicate with a Certification Authority CA which can operate to authenticate the user. The CA can operate to implement either an asymmetric (e.g. PKI) or symmetric key encryption/decryption algorithm.

By meeting these minimum requirements the PDs can function such that either device can become the coordinating device (provided it includes a UT and associated circuitry) This feature permits the PDs to reverse roles with respect to transmission or reception of an encryption key and other duties of the coordinating device. Lastly by both PDs adding unique keys into the final encryption, the discovery of one of the keys does not compromise the system and is particularly advantageous in avoiding the negative consequences associated with interception of the wirelessly transmitted key by a third party. Reliance on dual key generation is consistent with best practices known as "defense in depth".

In one embodiment of the invention, the CA, generates two separate, independent, time variable encryption keys in association with each user wherein the CA generated keys correspond (i.e. identical or correlated uniquely) to the keys generated by the first and second personal devices under the control of the user. By using both a first key transmitted from one device to the other, as well as a second key generated locally in the device receiving the transmitted key (the coordinating device), no harm can come from an unauthorized interception of the first key transmitted wirelessly from the first to the second device. Should the user lose control of either device, such as by misplacement or theft of one of the devices, successful authentication of the user by a third party who comes into possession of the misplaced or stolen device would be virtually impossible.

In a more specific embodiment of the invention, an authentication system is provided for authenticating users in accordance with an encryption/decryption algorithm (which may be either a symmetrical or asymmetrical key algorithm using first and second separately unique encryption keys that are time variable and are uniquely associated with each user). In this embodiment, two personal devices are provided including a first personal device under the control of the user for generating the first time variable encryption key using a time variable key generating algorithm wherein the first personal device includes a key transmitter for transmitting wirelessly within the immediate vicinity of the user the first encryption key. The second personal device operates as a coordinating device under the control of the user for generating the second time variable encryption key using the encryption key generating algorithm wherein the second personal device includes a key receiver (e.g. wireless receiver) for receiving the first encryption key, and a message transmitter (e.g. wireless transmitter) for transmitting the encrypted message. This embodiment provides an encrypting signal processor for encrypting a message using the first and second encryption keys in accordance with the encryption/decryption algorithm wherein the signal processor may be located in one of the personal devices or may be located in a remote (e.g. cloud) computer. This embodiment further provides a certification authority for authenticating a user upon receipt of the encrypted message transmitted from the second device, wherein the certification authority includes a key generator for generating the first and second encryption keys uniquely identifying each user and a decrypting signal processor for decrypting the message using the first and second encryption keys in accordance with the encryption/decryption algorithm to verify the identity of the user having control of the first and second personal devices.

More particularly, the present invention contemplates an authentication system that includes a key generating device having an external configuration suitable to be mounted or worn on a user's body for wirelessly transmitting within the immediate proximity of the user's body a key signal comprising secret or private key information corresponding to the time variable encryption key and a second device, physically separated from the wearable personal device including (1) a wireless receiver for receiving the key signal transmitted by the wearable key generating device and (2) a local signal processor for use in forming an encrypted signal in accordance with a predetermined encryption/decryption algorithm including information relating to the user's identity and for forwarding the encrypted signal to the AA without the use of an optical link that would require specialized optical imaging and optical scanners at a retailer's point of sale. Either or both personal devices can serve as a coordinating device provided each includes, or has access to, a user interface for interacting with the user.

The subject invention also allows secure authentication of end users, such as consumers involved in a proposed financial transaction with a retailer, without revealing any sensitive information to the retail participant. This is an important feature as it removes any responsibility by the retail participant for keeping the transaction data safe from unauthorized disclosure.

A further objective of the present invention is to leverage the '397 technology to provide a highly secure and unobtrusive method to allow on-site "retail" purchases. The subject invention can also be used to achieve enhanced security and simplicity when used to undertake online transactions.

The present invention allows all sensitive information to be entirely encrypted and therefore even if the retailer or other party handles or witnesses the encrypted information, the underlying sensitive information is not easily discoverable. Furthermore the sensitive data is only valid for short periods of time. Even it if is somehow stolen and decrypted, it can only be used while the keys are valid which can be configured to be extremely short periods of time or limited to a single use.

Other objectives, advantages and benefits are provided by
   different embodiments of the invention (individually and in various combinations and permutations) including the following:
   a. The end user will experience the same security and ease of use within the retail purchasing environment that is discussed more generally in the '397 patent.
   b. No chain of trust certificate is required to ensure authentication of transacting parties. However use of one is not precluded if such use is expedient or convenient in certain applications
   c. The subject invention does not rely on the use of public keys for any User or Retail party to ensure authentication of a counter-party.
   d. The subject invention does not require or permit the access of any party to unencrypted sensitive transaction information except for the client and the Authentication Authority.
   e. No party requires proprietary hardware (all parties can run software on generic computer devices including the retail device).
   f. The subject invention relies on a Certification Authority entity that possesses symmetric key data allowing it to authenticate and decrypt transaction information from the retail and user parties. This Authority may take the form of a centralized service or a diverse consensus driven, cloud based, distributed computing system employing block chains using a cryptographic hash of the successive blocks, a timestamp and transaction data for each transaction.
   g. Every transaction will be identified by a unique transaction ID that can be used to confirm the authenticity of the transaction details when sought by the client or the retailer or requested by another party permitted by the rules of the AA.
   h. The highly versatile paired personal devices will further facilitate more reliable protected area access by improving the reliability of individual authentication.

As a result of the inventive configuration, numerous technical improvements are provided over the prior art. The embodiments of the invention include combinations of features that, prior to this disclosure, were not well-understood, routine or conventions combinations.

Other objectives, benefits and advantages can be appreciated from the following Description of the Drawings and Detailed Description.

DETAILED DESCRIPTION

Figure 1:
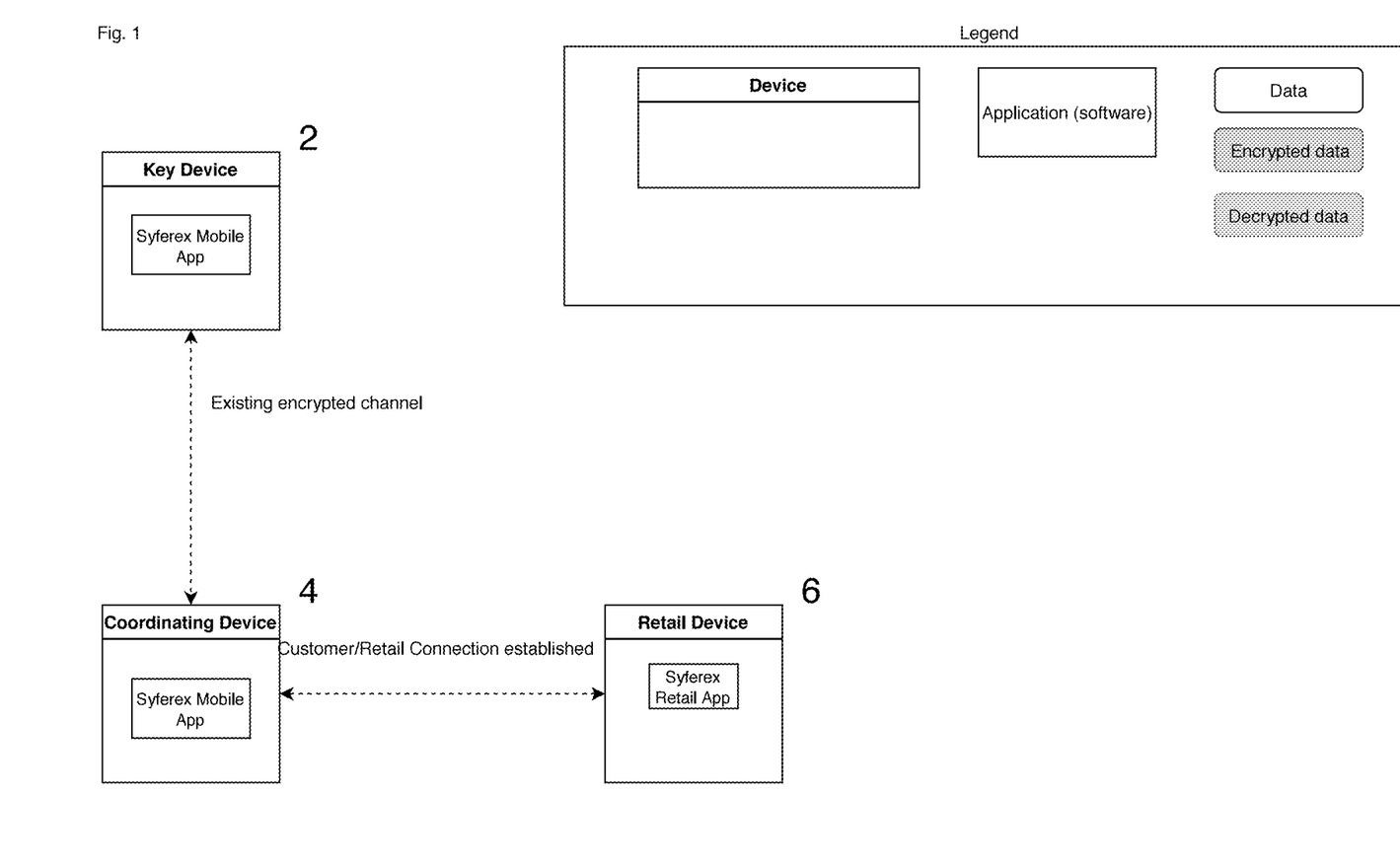
FIG. 1 is a diagram of an embodiment of the subject invention suitable for use in a point of sale retail environment wherein the user has first and second personal devices (e.g. a Key device and a Coordinating Device) within a retailer's establishment equipped with a Retailer Device adapted to communicate with the user's Coordinating Device.

With reference to FIG. 1, an embodiment of the subject invention is illustrated wherein a pair of user controlled computing devices, such as personal devices 2 and 4, designed in accordance with the subject invention, are illustrated. User controlled computing devices may take a variety of forms provided each such device is capable of (1) generating a time variable encryption key, and (2) communicating that time variable encryption key to a second user controlled computing device. Desirably, the user controlled computing devices should be under the exclusive control of the user, at least during the time that each device is used to implement the encrypted communication contemplated by this invention. At least one of the user controlled computing devices (and desirably both) includes (or communicates with) a user interface UI. Such UI may be incorporated into the user controlled computing device or may be separate therefrom. For example the user interface may take the form of a holographic display, a display screen, a connector for interfacing with a monitor or any other form that allows a user to interact with either or both of the user controlled computing devices to implement the encrypted communication which is the purpose of this invention. In a more specific embodiment of this invention illustrated in FIG. 1, the user controlled computing devices may take the form of personal devices 2 and 4 such as a wearable (e.g. smart watch, bracelet, ring, patch, necklace, or other type device whose exterior configuration makes it suitable to be semi-permanently or permanently mounted on or in the user's body) or as a handheld (e.g. smartphone, cellular phone, micro-computer, tablet PC or other type device whose exterior makes its suitable to be handheld). Alternatively, each (or both) of the personal devices 2 and 4 may also take the form of a subcutaneous chip suitable to be implanted in the user's body or even take the form of a "virtual" personal device located in a remote computer (i.e. in the "cloud") so long as the user is able to exercise, for all practical purposes, exclusive access to (and operation of) the personal device, at least during the time that the device is used to perform encrypted communication using the method of this invention. A virtual device would satisfy the requirements of this invention provided the computing function of the virtual device was only available to the user in all practical and normal-use situations. The fact that a systems administrator might have some type of supervisory access and/or control over the virtual device would not preclude such virtual device from performing as a personal device for purposes of this invention provided the end user can exercise control and access to the exclusion of all unauthorized individuals.

A personal device may be a static component (such as a desk top computer) that is controlled by the user such as being located in a facility to which access may be controlled by the user (such as the user's home or private office). A personal device may be available to another but only if that person is required to present authenticating information that distinguishes that person from the authorized end user or that person is given physical control by the end user. In other words, a smartphone remains a personal device even if its owner should give possession of the smartphone to another person.

Control of the device means that the user has the ability to activate and deactivate the device, to the exclusion of others at least during the time that a device is used to perform this invention, by virtue of physical proximity or entering user codes (e.g. user name and password) or by biometric scans (e.g. fingerprint, facial or iris scan or other DNA dependent scans) or by proximity of the user to the paired devices.

As will be described in greater detail below, each or both of the personal devices may be equipped with a processor suitable to implement an encryption/decryption algorithm for implementing the features of this invention that will be described in more detail below. A suitable algorithm will be generically referred to hereafter as a Syferex algorithm or Syferex programs (e.g. Syferex mobile apps or Syferex retail apps) for shorthand purposes so long as the respective algorithm/program causes the personal device/Retail Device or other component to perform the functions described below.

Specifically with respect to retail transactions, a characteristic of the subject invention when applied to the retail environment, is that the user employs his pair of computing devices, while under his control, to form an encrypted transaction message, for transfer to the certification authority, that always includes at minimum:
 1. the two time variable encryption keys generated respectively by the user controlled computing devices,
 2. an identification of the retailer providing the services and/or products to the user, and
 3. an identifier that can be linked to the details (or include the details) of the transaction involving the services and/or products including for example
    a. date and time of the transaction, and
    b. the specific services and/or products being supplied to the user by the retailer,
whereby the certification authority can validate and record the transaction in association with the retailer and the user.

Different steps and procedures may be employed to allow communication between the user and the retailer directly or via parties, including but not limited to, the AA, to identify the details of the transaction such that in the end the user is able to approve the transaction with accurate knowledge of the substance of the transaction.

FIG. 1, a User (not shown) having control of the personal devices 2 and 4 selects goods to be purchased and provides them to a retailer end point such as a retail device 6 programmed to perform the steps described below. The retailer device 6 and personal device 4, functioning as a coordinating device create a connection that ensures that data transmitted between the user and the retailer is accurate (and ideally private). This can be achieved in a number of was, including sharing a secret via an out of band communication path or using a chain of trust system.

Figure 2:
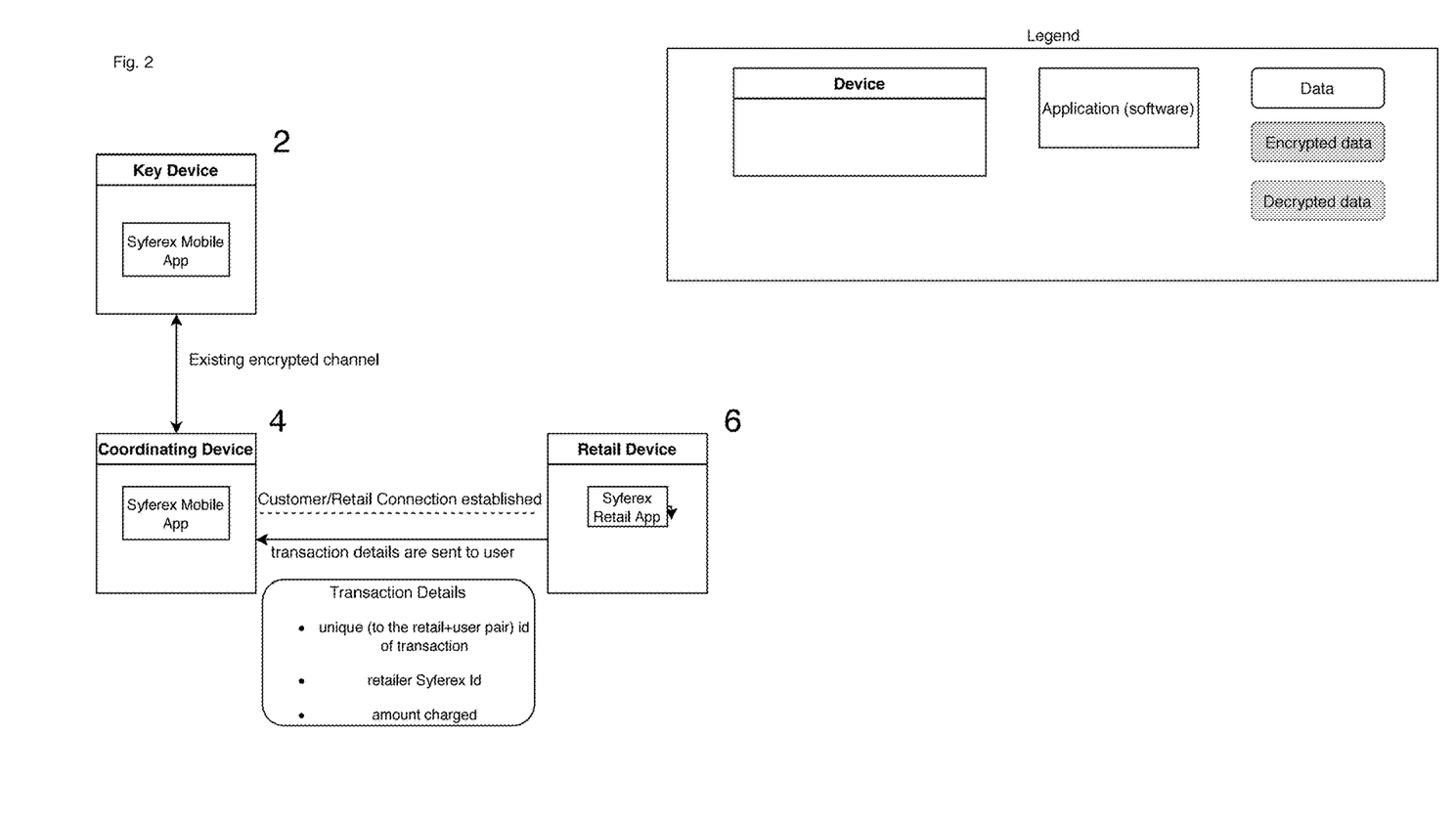
FIG. 2 is a diagram of the system disclosed in FIG. 1 in which transaction details have been transmitted from the Retail Device to the Coordinating Device for display to the user.

In FIG. 2 the retail device 6 provides details of the transaction and the retailerId to coordinating device 4 via the previously established connection. Summary data such as a hash of these details can be used to confirm the accuracy of the provided data (optionally provided via an out of band side channel).

Figure 3:
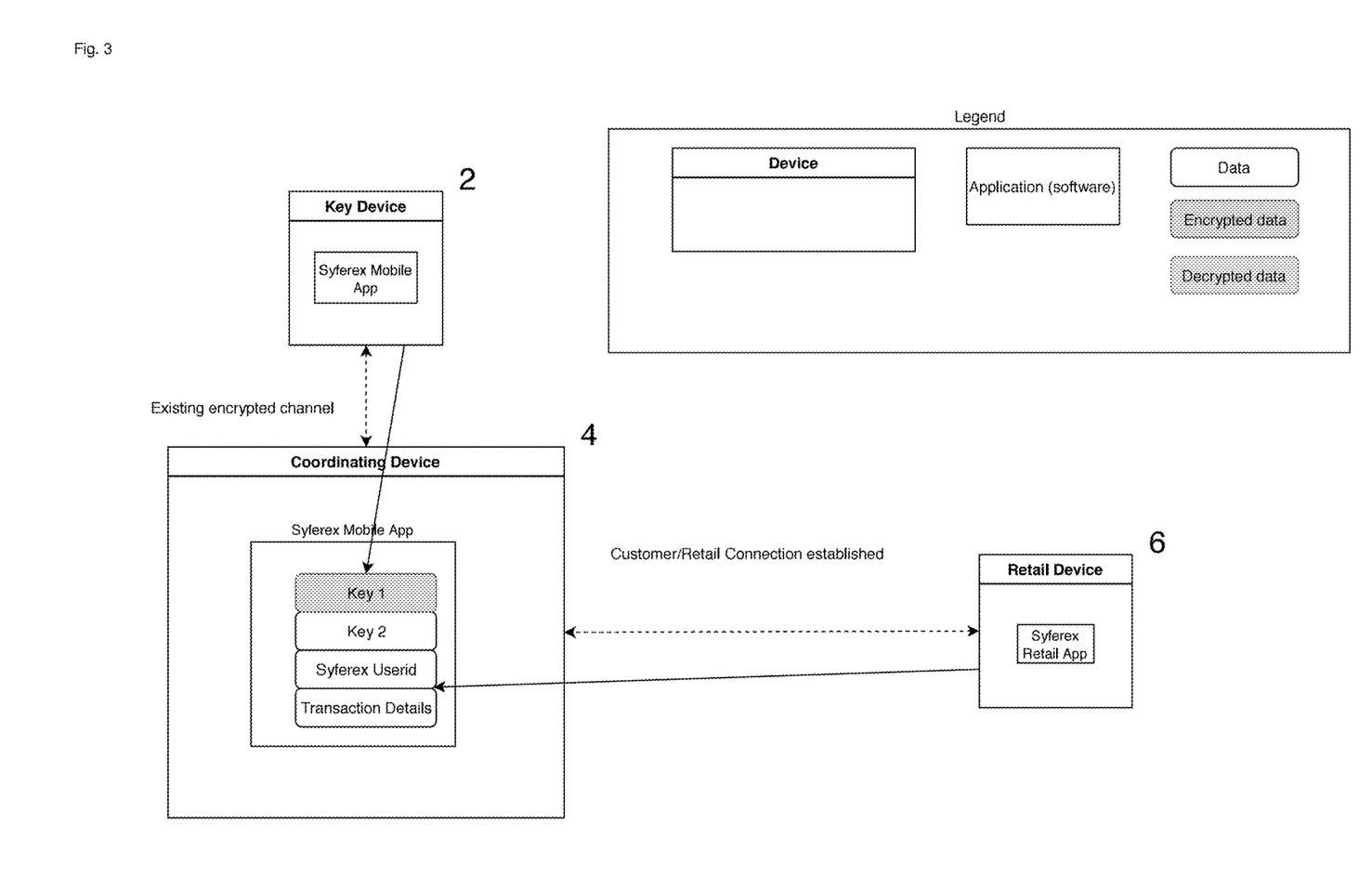
FIG. 3 is a diagram of the system disclosed in FIG. 1 in which the Coordinating Device is communicating with the Key Device and the Retail Device to allow generation of an encrypted message using key 1 supplied by the Key Device and key 2 generated locally by the Coordinating Device and the user ID generated in accordance with the encryption algorithm being implemented by the system (Userid).

FIG. 3 illustrates how the user's coordinating device 4 receives a key generated by, and communicated by, the personal device 2 operating as a key generating device in accordance with the protocol described herein (Syferex protocol). If after review of the transaction details, the user decides to continue with the transaction, his or her assent entered into the coordinating device (personal device 4) causes the software to prepare a message containing the transaction details mentioned above and the user's userId (Syferex userId).

Figure 4:
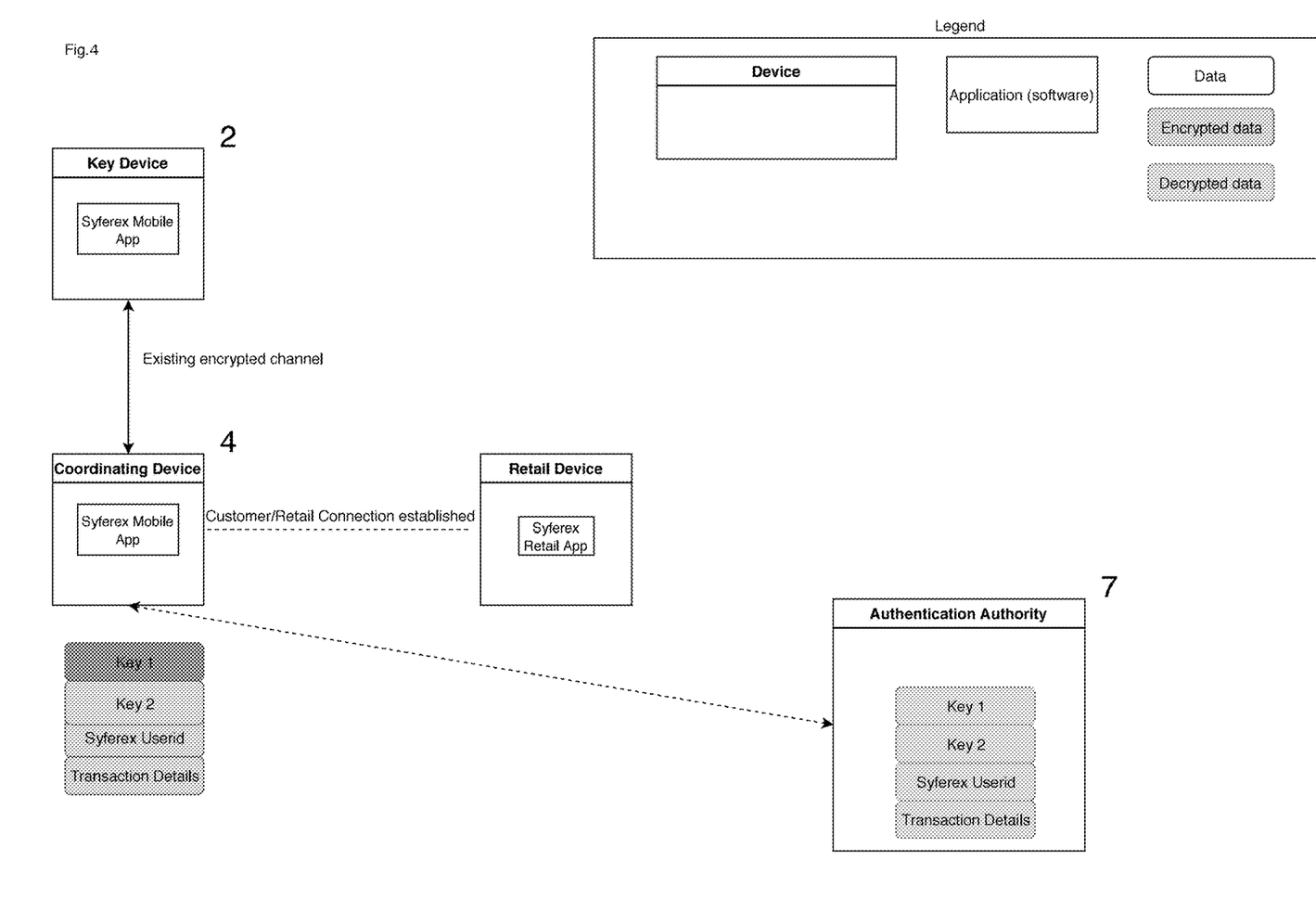
FIG. 4 is a diagram of the system disclosed in FIG. 1 in which the encrypted message has been sent to the Authentication Authority for decryption and authentication that is communicated to the Coordinating Device.

FIG. 4 shows the message generated above being encrypted using the 2 keys provided by the key generating device (personal device 2) and the coordinating device (personal device 4) and sending it to a certification authority 7 operating as an authentication authority AA. Because only the AA can decrypt the message and only the encryption keys specific to that user will successfully decrypt the message, the message is secure and can self identify the user who has sent it. At this point the AA can initiate any financial transaction required secure in the knowledge that the user was indeed to person authorizing the transaction.

Figure 5:
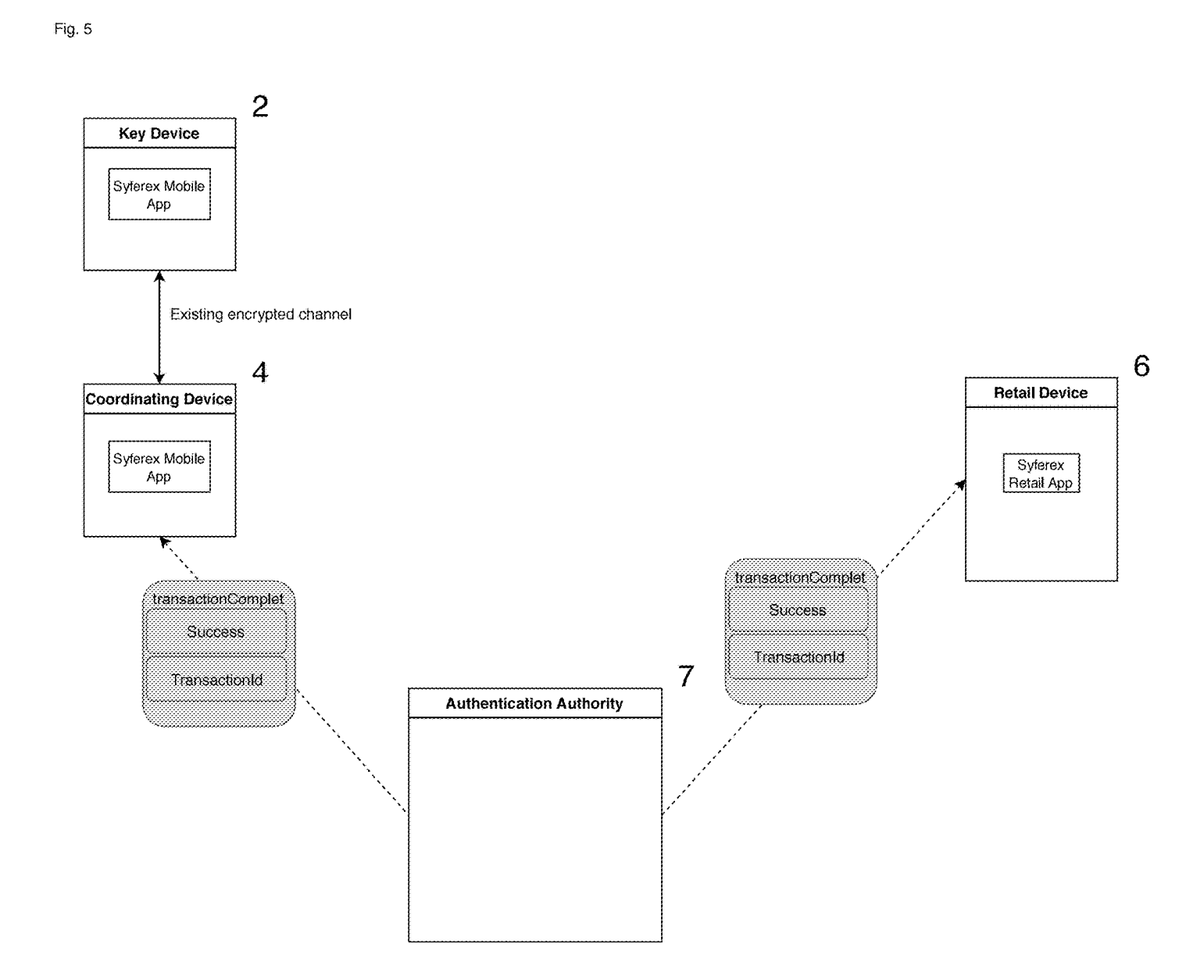
FIG. 5 is a diagram of the system disclosed in FIG. 1 in which the AA 7 is taking necessary actions to complete the financial transaction and to report the result.
Figure 6:
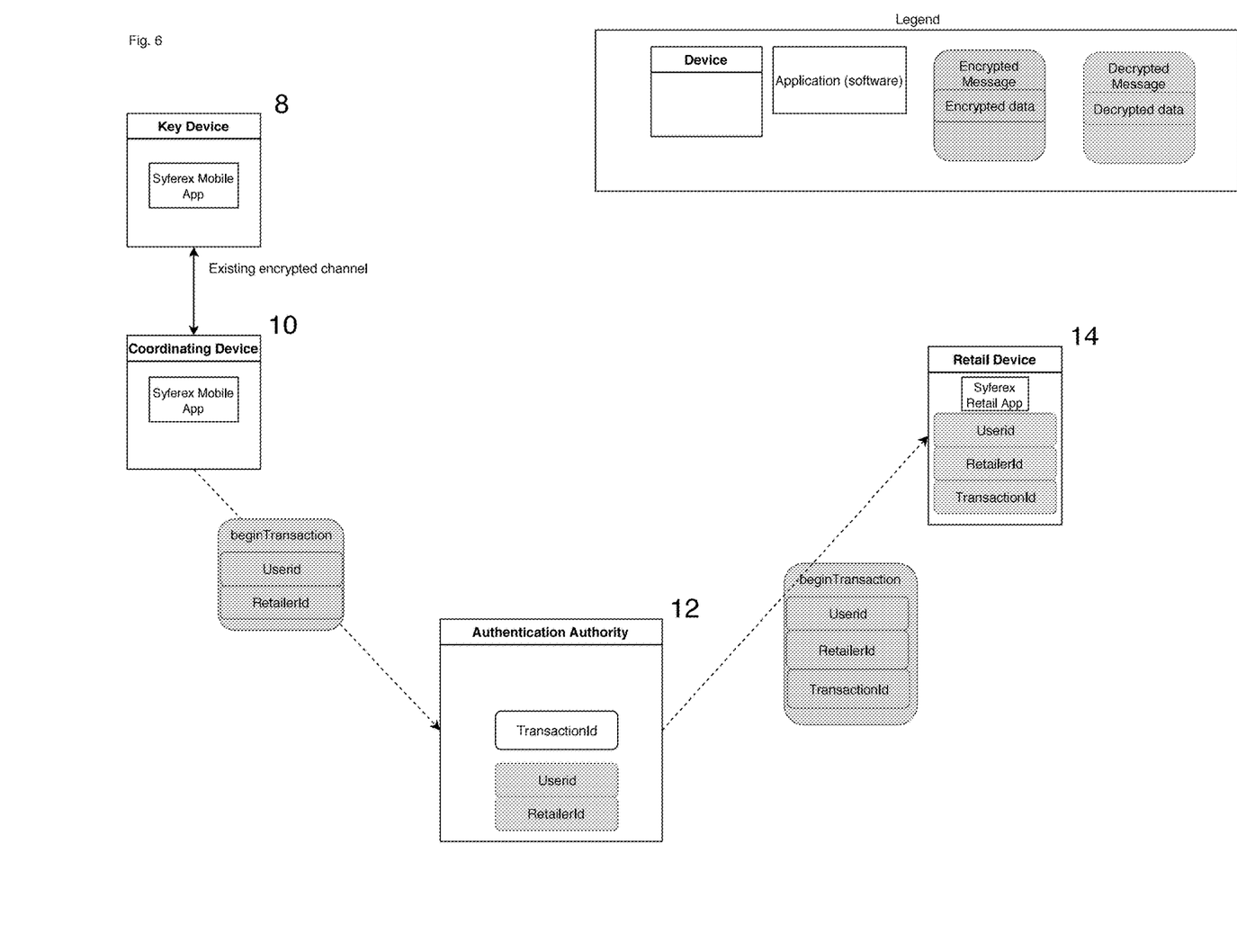
FIG. 6 is a diagram of an alternative use of the subject invention to effect a transaction with a Retail Device in which the pair of personal devices operate to forward an encrypted "begin Transaction" message to the Authentication Authority which, in turn, forwards an encrypted message to a Retail Device including a Transactionid.
Figure 7:
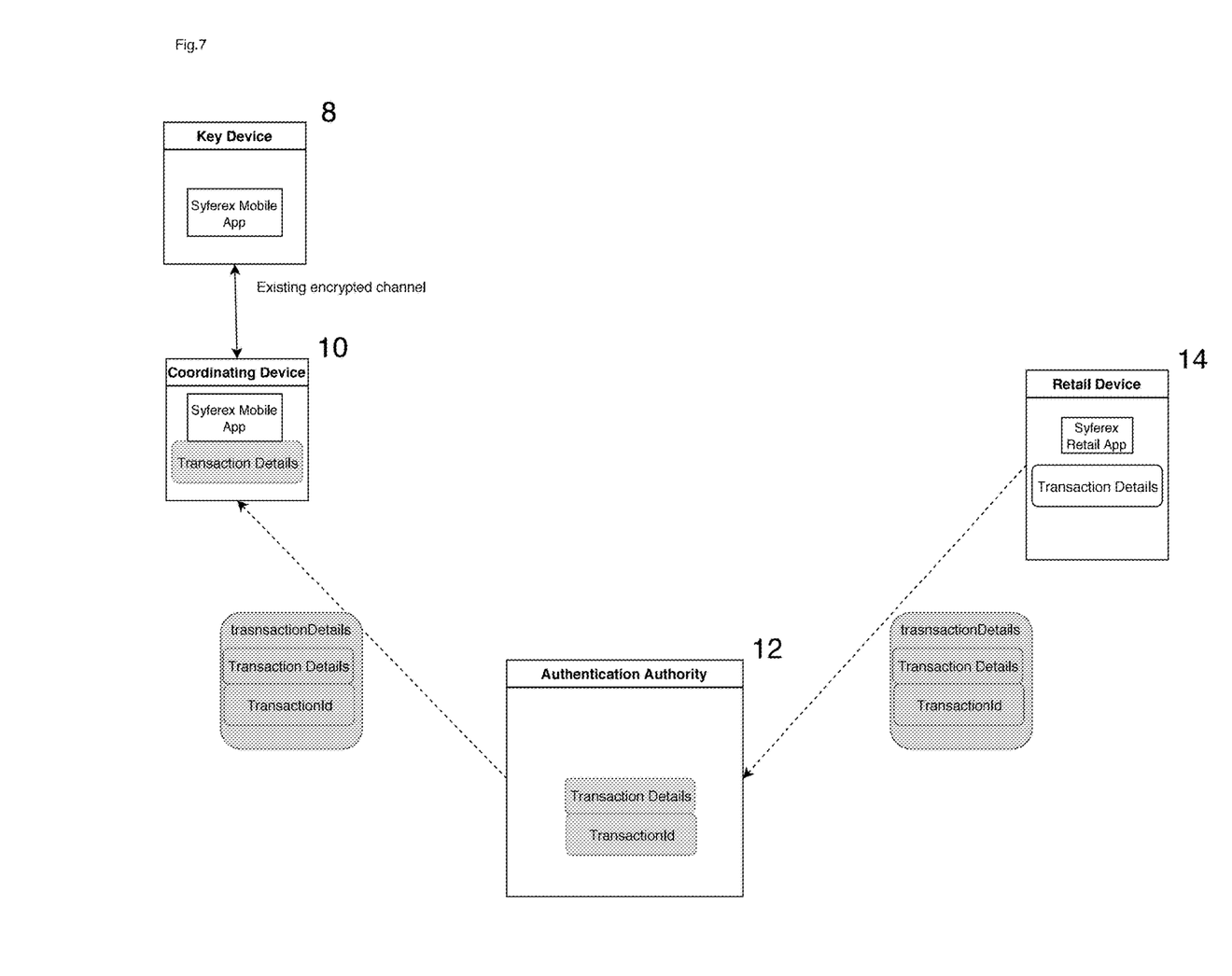
FIG. 7 is a diagram of the system disclosed in FIG. 5 in which transactions Details are sent to the Authentication Authority by the Retail Device for transmission to the Coordinating Device for display of the Transaction Details for the User.
Figure 8:
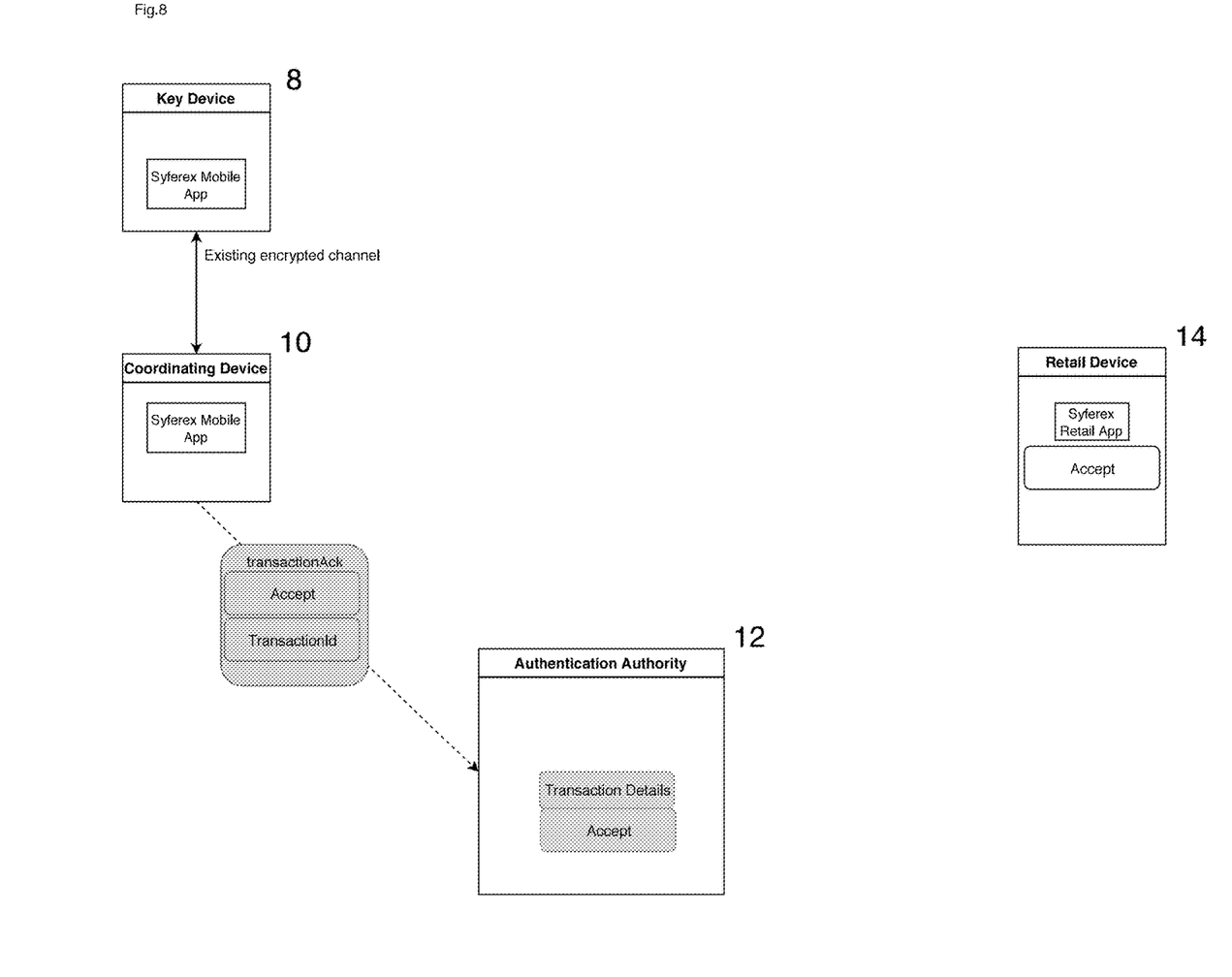
FIG. 8 is a diagram of the system disclosed in FIG. 5 in which the Coordinating Device returns an encrypted message to the Authentication Authority to indicate user acceptance of the terms of the transaction.

FIG. 5 shows the AA 7 taking necessary actions to complete the financial transaction and reporting the result of that transaction to both the user and the retailer Description of the Embodiment of the Invention Illustrated in FIGS. 6-8

Reference will now be made to an additional embodiment of the invention. Referring more specifically to the system illustrated in FIG. 6, a User (not shown) having control of a pair of personal devices selects goods to be purchased and determines the retailerId. The retailerId can be provided to the User in a variety of ways including based on geographical location, broadcast of retailers id on a local wireless network, entry of the retailerId manually or through Off the Record OTR means (such as a qr code or optical scan). One of the personal devices is equipped with a user interface UI (including for example a touch screen, not illustrated). This personal device may be used as a Coordinating Device 10 by the User. Through the UI, the User indicates he or she wants to initiate the transaction with the retailer. The Coordinating Device 10 includes a transceiver (not shown) for receiving a time variable encryption key provided by the other personal device (which may be referred to as a Key Device 8 since, in this embodiment, the other personal device functions primarily to provide a time variable encryption key, which may be generated using a pseudo random number). The key is generated and transmitted wirelessly over an encrypted channel to the Coordinating Device 10 provided the devices are sufficiently close in proximity to allow the transmission signal to reach the Coordinating Device 10. In addition, a mobile app is installed in the personal device 10 and includes instructions causing a processor in the Coordinating Device 10 to perform the functions described herein. In particular, the mobile app causes the processor of Coordinating Device 10 to generate locally a second time variable encryption key which may also be based on a different pseudo random number. Thereafter, the Coordinating Device 10 uses the two encryption keys to encrypt a begin Transaction message which contains the retailerId.

It should be noted that the user could potentially supply a temporary username that it would like to use for this transaction. Alternatively, an authenticating authority (AA) 12 (which is a certification authority functioning to authenticate users) could obtain the userId from the retailer via linkage with a Retail Device 14 (i.e. a device under the control of the retailer for supplying the retailrId and other functions as described below). The AA 12 is programmed to link the userId to the temp username for recording purposes. Also the user could supply a unique or rare "secret" that would be passed to the retailer so the retailer could show this to the user so the user could verify the retailerId supplied resulted in the transaction beginning with the correct retailer.

The AA 12 receives a beginTransaction message and decrypts it using symmetric keys generated by the AA 12 that are identical to the encryption keys generated by the Key Device 8 and the Coordinating Device 10. The process of generating identical (or corresponding) symmetric keys is understood and can be effected by key generation algorithms that start with identical seeds but which produce a series of identical keys that (even if intercepted) cannot be used to predict the next encryption key generated by the key generation algorithm. This allows the AA 12 to authenticate the user provided the AA 12 is previously informed of the identity of the user (including sensitive user information) and the seed for the encryption key generator. Using the retailerId provided to the AA 12 determines how to contact the retailer and potentially carries out sanity checks. The AA 12 generates a unique transactionId and sends a transactionBegin request to the Retailer Device 14 residing at the retailer's location or at a location under the control of the retailer. The retailer receives the transaction begin message and confirms with the user that the transaction has begun.

In FIG. 7 the embodiment of FIG. 6 is now operating through the Retailer Device 14 to collect the transaction details and sends these to the Coordinating Device 10 which sends these details, in encrypted form to the AA 12 in a transaction Details encrypted message. The AA 12 then authenticates and decrypts the message and then sends a transaction Details message containing the same data to the user's Coordinating Device 10 after encrypting the message with the appropriate encryption keys. The Coordinating Device 10 can decrypt this message, thus authenticating that the message came from the AA 12, and display the transaction details in non-encrypted form on the screen (not shown) of the Coordinating Device 10. The Coordinating Device 10 optionally compares the transaction details to similar transaction details displayed by the Retail Device 14 if such is available to the User.

In FIG. 8, the embodiment of FIGS. 6 and 7 is now operating to allow the user to review the transaction being displayed and to indicate an acceptance of its terms. To facilitate this, the Coordinating Device 10 will create a transactionAck message with an accept value and the transactionId as payload and encrypt the message with the dual encryption keys (generated in the Key Device 8 and Coordinating Device 10) and send the message to the AA 12. The AA 12 will then take what action is required to execute the financial transaction with the appropriate parties as necessary.

Figure 9:
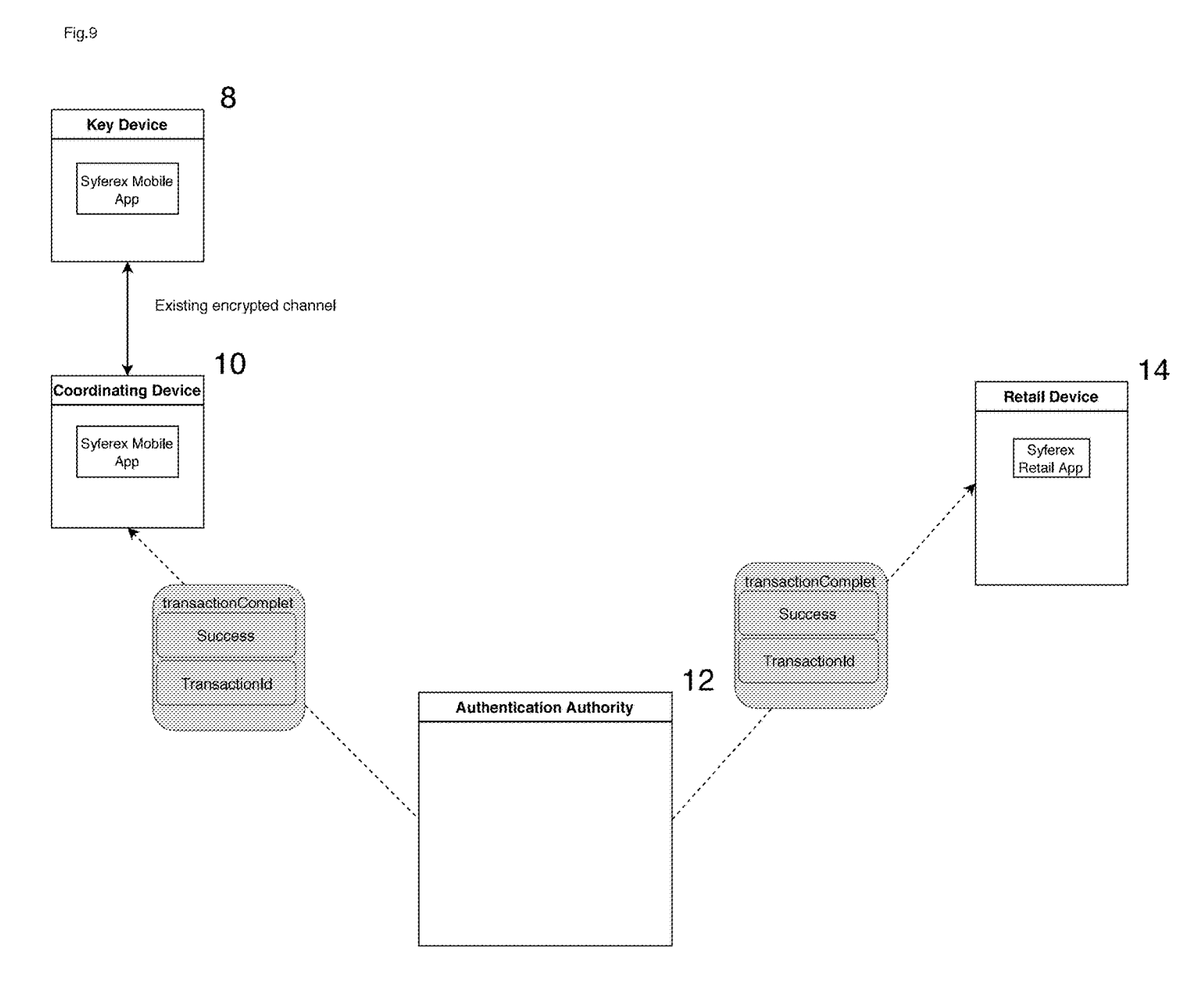
FIG. 9 is a diagram of the system disclosed in FIG. 5 in which the Authentication authority forwards an encrypted message to both the Coordinating Device and the Retail Device indicating that the transaction has been successfully completed.

In FIG. 9, the AA 12 of the embodiment illustrated in FIGS. 6-8, is now sending the transactionComplete messages to the user and retailer using appropriate respective authentication and encryption methodologies indicating if the transaction has succeeded or not. It may supply a reason if the transaction fails.

The system never requires the user to actually enter or view any security data in such a way that it can be recorded. This is a very important advantage of the disclosed invention. Anytime a user is required to display keys (such as an RSA token or QR code) or enter data (such as a password), the displayed information can be recorded. This advantage of the disclosed invention will become more important in the future given the hugely expanding amount of video surveillance in use worldwide.

A very important addition advantage in certain embodiments of the disclosed invention is that one of the personal devices (such as the device that takes the form of a wearable or implantable chip) could be used to store encrypted personal data (generated in the other personal device e.g. the user's smartphone). In particular, sensitive data could be sent wirelessly to the first personal device (e.g. the wearable) for storage therein where it can be held in encrypted form available only to the user and unavailable to third parties having no direct physical possession of the body mounted computer. Since the data would be stored outside of the smartphone it would not be compromised upon the loss or theft of the user's smartphone. At the same time, the personal information would only exist within the memory of the wearable and would be encrypted so that it could not be retrieved by anyone without the cooperation and knowledge of the user.

An important advantage of the disclosed invention derives from the ability of both personal devices to serve as a coordinating device by providing both devices with a user interface UI In particular, if the two devices take the form of a paired smartwatch and smartphone, the smartwatch can serve to display relatively common, simple transaction details such as the purchase of a cup of coffee. In such circumstances, the smartwatch display could be used to display the simple transaction details requiring the user to merely touch the smartwatch screen to indicate approval thereby obviating the need to remove the user's smartphone from his/her pocket or purse. Where a more complicated transaction is being considered, the larger display of a smartphone, tablet, laptop or even desktop would be better suited.

Another important advantage of the present invention over the invention disclosed in the '397 patent is that the handheld device of the '397 invention can be replaced by second wearable device, physically separated from the wearable key generating device, having an external configuration suitable to be mounted or worn on (or implanted in) a user's body. This second wearable device includes a wireless receiver for receiving the key signal transmitted by the wearable key generating device for use in forming an encrypted signal in accordance with a predetermined encryption/decryption algorithm including information relating to the user's identity all as disclosed more fully in the '397 patent.

The pair of devices used in this improved authentication system would permit greatly expanded functionality over the functions disclosed in the '397 patent. In particular, the first device could take the form of a permanently mounted device (such as a subcutaneous chip) and could operate a display that is generated by an implant in the eye of the user or as part of a pair of eyeglasses that is capable of creating a virtual image in the view of the user. In this configuration, the eyeglasses could form the second wearable device. The second device could also take the form of a semi-permanently mounted device (such as a smartwatch) that includes a user interface allowing the user to enter commands/information on the touch sensitive surface of a display. The touch sensitive surface to also respond to finger movements to control the location of a cursor movable throughout the image created by the eyeglass or eye implanted chip for generating a viewable image in the field of view of the user. Possible Alternative Implementations Phase 1 locd and authenticated session is established between the coordinating device and the retail endpoint. Care must be taken to reduce the opportunity for a man in the middle attack. In particular, care must be taken to ensure that the client is connected to the actual retail endpoint, instead of a man in the middle or impostor. The danger here is that some entity could masquerade as the retail outlet. Such an entity could appear to be the retailer to the customer, and the customer to the retailer. Such an entity could then intercept the retailer's data, discard it, and replace it with a transaction of its own, substituting itself as the retail party.

Well known methods for avoiding this problem include Chain of trust certificates. While not full proof, two available solutions are:

1. Use the AA as an intermediary, that can authenticate both parties and decrypt and re-encrypt data meant for the counterparty.
2. Use public keys for each—the challenge here is where to retain these public keys. The AA presents a logical repository.
3. Use chain of trust
4. Retailer and Consumer share a secret via an off the record (OTR) channel. This could be the retailerID, or some other secret key that allows authentication of the these parties in future communications.
5. The AA can be promoted to provide encryption keys or the retailer id to the interested parties. This can be done dynamically or in a cached manner on the syferex applications.
6. The AA can be used as an intermediary
7. Retail terminal and the user device display a representation of the transaction details including all of the required details above (most importantly the retailerId). This representation (visual hash, hash code, qr code etc or other Off The Record (OTR) channel would be compared by the user and if they match, the user would submit to the authentication authority.
8. The retailer provides a code to represent the transaction and sends an encrypted copy to the AA. The user could then get the transaction id from the retailer using OTR and request a copy of the transaction from the AA via an encrypted request. The AA can send a transaction summary to the user encrypting it using the user's Syferex keys. The user can review the transaction, then approve by sending an ack message to the AA encrypted with the user keys.

Phase 2: transaction details are presented to client
the retail endpoint provides transaction details to the client.
required components of transaction details:
unique (to the retail+user pair) id of transaction
retailer Syferex Id
amount charged options components:
list of items being purchased.
other details the retailer wants to display to user at time of purchase (company logo, advertisements, etc)

Phase 3: Encryption of transaction record and submission to authentication authority.
User can review details of the transaction and accept or decline the purchase. For ease of use, all interaction on the user's part needs to be done through a single device (though it should also be possible for either Consumer device to be used as the coordinating device). Upon accepting the transaction the Syferex software on the coordinating device will generate its own key and request a paired key from the key device. The coordinating device would then use the 2 keys to encrypt the message with the required transaction information listed above provided by the retailer in a manner such that only the authenticating authority can decrypt it. This package can then be forwarded either to the retailer or to the authentication authority directly from the user device. The implementation must ensure that the user need not take any action (input no password or details) for the authentication information to be created and forwarded. The Syferex software handles this seamlessly when prompted by the accepting of the transaction.

Phase 4: Authentication by authentication authority:

Upon receipt of the transaction package from the user device the Authentication Authority will decrypt the package and using the consumerID in the package compare the 2 keys provided with its local key store to determine if the Consumer is indeed who she claims to be. It will then examine the transaction details to ensure this is a unique transaction that has not been previously approved. If approved the authentication authority will either contact the financial institution with the transaction details and identification of the user, or possibly release these kinds itself. At this point, the AA can execute the financial transaction by, for example, authorizing a Financial institution to undertake to complete the transaction and by accepting conditional legal and financial responsibility (in exchange for a modest fee) for the consequences should the identity of the consumer prove to be incorrect. All parties to the transaction will benefit by elimination of significant opportunities for fraudulent actions that exist in most financial transactions that take place in the retail environment where credit is extended to the user or even cash is now used by the purchaser.

Instead of the user collecting the transaction details and retailerId and submitting the transaction to the AA to be forwarded to the retailer and matched to a pending transaction on the retailer's local system (the checkout counter for example), the user could supply their UserID (via broadcast or OOB channel) to the retailer. Since the retailer already has the other components of the transaction (the products, cost and retailerID) the retailer can add the userId to the pending transaction information and send it securely to the AA. The AA then can ensure that the transaction summary is forwarded to the specified user for approval. The advantage here is two fold: existing retail hardware used for retail transactions (product scanner, inventory verification, receipt generator) etc can be leveraged. Additionally, the human motivation to inject erroneous userids into the transaction are limited. Such a compromised transaction would result in the AA sending the transaction to the injected user, who would then have the option to reject the transaction or accept it. In the case this transaction is accepted the actual user would not lose money. The retailer would receive the funds expected and the true user should be able to identify the fraud (i.e. the transaction would never be forwarded to the true user for approval). Such a scenario would of course be undesirable and systems and policies would and can be instituted to eliminate or reduce the possibility of this type of fraud happening, Secure area access control will be enhanced by the increased accuracy and convenience of the present invention over prior art access control devices.

It should be further noted that the User device could create a complex key and encode userid with said key to the retailer. Then the retailer could receive the encrypted user id and provide inventory of the purchase to the user along with a selection of random data options (colors, icons, numbers) via a line of sight interaction (displayed on a screen for instance). Thereafter, the user selects one of these options and this selection is included in the transaction summary that is encoded by the retailer and sent to the AA. This message therefore includes The userid encoded by the users syferex complex key (only AA can decrypt)
The transaction details (items and price)
The secret selected by the user
The retailer id
The entire message is encrypted (possibly using the public key of the AA or maybe the syferex key of the retailer)

The AA decrypts the package and authenticates the user by proving that it can only decrypt the users id with the user's syferex key. It confirms that the transaction is valid (user has sufficient funds) and then encrypts a summary of the transaction and the secret selected by the user with the users syferex key and send it to the user. The user can confirm that the transaction is valid and ack the transaction back to the AA who will the process the transaction. This ack must contain a copy of the transaction details to ensure that it is only usable for the current transaction (otherwise nefarious actors could replay this ack for multiple copies of the same transaction (transaction ID should accomplish this)

To "man in the middle" MIM attack this transaction, the MIM will need to fake the inventory of the transaction (can be done, for instance, at Starbuck's most transactions are a large coffee) and the secret chosen by the user [not easy to fake by the MIM, though possible by observing the OTR channel (watching the user select the secret)].

Additionally, other combinations, admissions, substitutions and modifications will be apparent to the skilled artisan in view of the disclosure herein. Accordingly, the present invention is not intended to be limited by the description of the various embodiments but is to be defined by a reference to the appended claims.

The invention claimed is:

1. An authentication system for authenticating users in accordance with an encryption/decryption algorithm using first and second separately unique encryption keys that are time variable and are uniquely associated with each user, comprising A. a first user controlled computing device under the control of the user for generating said first encryption key using an encryption key generating algorithm, said first user controlled computing device including a key transmitter for transmitting wirelessly within the immediate vicinity of the user said first encryption key;

B. a second user controlled computing device, operating as a coordinating device under the control of the user, for generating said second encryption key using the encryption key generating algorithm, said second user controlled computing device including
  i. a key receiver for receiving the first encryption key, and
  iii. a message transmitter for transmitting said encrypted message;

C. an encrypting signal processor for encrypting a message using said first and second encryption keys in accordance with said encryption/decryption algorithm, D. a certification authority for authenticating a user upon receipt of said encrypted message transmitted from said second user controlled computing device, wherein said certification authority includes a key generator for generating said first and second encryption keys uniquely identifying each user and a decrypting signal processor for decrypting the message using the first and second encryption keys in accordance with the encryption/decryption algorithm to verify the identity of the user having control of said first and second user controlled computing devices.

2. The authentication system as defined by claim 1, wherein said encrypting signal processor is located within one of said user controlled computing devices.

3. The authentication system as defined by claim 1, wherein said encrypting signal processor is located in a remote computer.

4. The authentication system as defined by claim 1, wherein said first user controlled computing device includes said encrypting signal processor and said second personal device includes a second encrypting signal processor.

5. The authentication system as defined by claim 1, wherein one of said first and second user controlled computing devices includes a user interface for enabling user interaction with the authentication system.

6. The authentication system as defined by claim 1, wherein both of said first and second user controlled computing devices includes a user interface for enabling user interaction with the authentication system whereby the user may elect to use either device for interaction with the system.

7. The authentication system as defined by claim 1, wherein said key transmitter of said first user controlled computing device includes a receiver to form a first key transceiver for receiving the second encryption key and said first user controlled computing device includes a first encrypting signal processor for encrypting a message using said first and second keys in accordance with said encryption/decryption algorithm, and wherein said key receiver of said second user controlled computing device includes a transmitter to form a second key transceiver for transmitting the second encryption key within the immediate vicinity of the user whereby either said first user controlled computing device or said second user controlled computing device may operate as a coordinating device under the control of the user and wherein said certification authority is able to receive the encrypted message transmitted from either said first user controlled computing device or said second user controlled computing device for authenticating a user.

8. The authentication system as defined in claim 7, wherein said encrypting signal processor is located in a remote computer.

9. The authentication system as defined by claim 7, wherein said first user controlled computing device includes said encrypting signal processor and said second user controlled computing device includes a second encrypting signal processor.

10. The authentication system as defined by claim 1, wherein one or both of said first and second user controlled computing devices has an external configuration suitable to be mounted or worn on a user's body.

11. The authentication system as defined by claim 1, wherein one or both of said first and second user controlled computing devices has an external configuration suitable to be held in the user's hand.

12. The authentication system as defined by claim 1, wherein one of said first and second user controlled computing devices has an external configuration suitable to be mounted or worn on a user's body and the other user controlled computing device has an external configuration suitable to be held in the user's hand.

13. The authentication system as defined by claim 1, wherein one of said user controlled computing devices has an external configuration suitable for being implanted in the user subcutaneously.

14. A pair of user controlled computing devices adapted to operate with a certification authority to verify the identity of the user by implementing an encryption/decryption algorithm employing first and second encryption keys generated by a certification authority wherein the encryption keys are time variable and are uniquely associated with each user, comprising A. a first user controlled computing device under the control of the user for generating the first time variable encryption key using a key generating algorithm, said first user controlled computing device including a key transmitter for transmitting wirelessly within the immediate vicinity of the user said first encryption key; and B. a second user controlled computing device, operating as a coordinating device under the control of the user for generating the second time variable encryption key using the key generating algorithm, said second user controlled computing device including
  i. a key receiver for receiving said first encryption key, and
  iii. a message transmitter for transmitting said encrypted message;

C. an encrypting signal processor for encrypting a message using the first and second symmetric keys in accordance with said encryption/decryption algorithm, whereby the certification authority is able to verify the identity of the user upon receipt of the encrypted message transmitted from said second user controlled computing device.

15. The pair of user controlled computing devices as defined by claim 14, wherein said encrypting signal processor is located within one of said user controlled computing devices.

16. The pair of personal devices as defined by claim 14, wherein said encrypting signal processor is located in a remote computer.

17. The pair of user controlled computing devices as defined by claim 14, wherein said first user controlled computing device includes said encrypting signal processor and said second user controlled computing device includes a second encrypting signal processor.

18. The pair of user controlled computing devices as defined by claim 14, wherein one of said first and second user controlled computing devices includes a user interface for enabling user interaction with the certification authority.

19. The pair of personal devices as defined by claim 14, wherein both of said first and second user controlled computing devices includes a user interface for enabling user interaction with the certification authority whereby the user may elect to use either personal device for interaction with the certification authority.

20. The pair of user controlled computing devices as defined by claim 14, wherein said key transmitter of said first personal device includes a receiver to form a first key transceiver for receiving the second encryption key and said first personal device includes a first device signal processor for encrypting a message using the first and second symmetric keys in accordance with said encryption/decryption algorithm, and wherein said key receiver of said user controlled computing device includes a transmitter to form a second key transceiver for transmitting the second encryption key within the immediate vicinity of the user whereby either said first user controlled computing device or said second user controlled computing device may operate as a coordinating device under the control of the user and wherein said certification authority is able to receive the encrypted message transmitted from either said first user controlled computing device or said second user controlled computing device for authenticating a user.

21. The pair of personal devices as defined in claim 20, wherein said encrypting signal processor is located in a remote computer.

22. The pair of user controlled computing devices as defined by claim 20, wherein said first user controlled computing device includes said encrypting signal processor and said second user controlled computing device includes a second encrypting signal processor.

23. The pair of user controlled computing devices as defined by claim 14, wherein one or both of said first and second user controlled computing devices has an external configuration suitable to be mounted or worn on a user's body.

24. The pair of user controlled computing devices as defined by claim 14, wherein one or both of said first and second user controlled computing devices has an external configuration suitable to be held in the user's hand.

25. The pair of user controlled computing devices as defined by claim 14, wherein one of said first and second user controlled computing devices has an external configuration suitable to be mounted or worn on a user's body and the other user controlled computing device has an external configuration suitable to be held in the user's hand.

26. The pair of user controlled computing devices as defined by claim 14, wherein one of said user controlled computing devices has an external configuration suitable for being implanted in the user subcutaneously.

27. An authenticating system as defined in claim 1, wherein the first and second encryption keys are symmetrical encryption keys.

28. An authentication system as defined in claim 14, wherein the first and second encryption keys are symmetrical encryption keys.

29. A method for implementing an encryption/decryption algorithm employing a pair of user controlled computing devices adapted to operate with a certification authority to verify the identity of the user by first and second encryption keys generated by the certification authority wherein the encryption keys are time variable and are uniquely associated with each user, comprising the steps of A. generating a first time variable encryption key using a first user controlled computing device corresponding to the first time variable encryption key generated by the certification authority, B. transmitting wirelessly the first variable encryption key to the second user controlled computing device provided the first and second user controlled computing devices are operationally within the immediate vicinity of the user;

C. generating a second time variable encryption key using the second user controlled computing device corresponding to the second time variable encryption key generated by the certification authority, D. encrypting a message using the first and second time variable encryption keys generated, respectively, by the first and second user controlled computer devices, and E. transmitting the encrypted message to the certification authority in response to user instructions entered using one of the user controlled computing devices, whereby the certification authority is able to verify the identity of the user upon receipt of the encrypted message.

30. The method as defined in claim 29, wherein step (D) of includes the step of encrypting into the message information regarding a retail transaction between the user and a retailer including an identification of the retailer providing the services and/or products to the user, and the details of the transaction involving the services and/or products, whereby the certification authority can generate an identifier that can be linked to the details (or include the details) of the transaction involving the services and/or products.

* * * * *